(12) United States Patent
Matono et al.

(10) Patent No.: US 7,019,944 B2
(45) Date of Patent: Mar. 28, 2006

(54) THIN FILM MAGNETIC HEAD CAPABLE OF INHIBITING OCCURRENCE OF TRACK ERASING

(75) Inventors: Naoto Matono, Saku (JP); Akihiro Oda, Chuo-ku (JP)

(73) Assignees: TDK Corporation, Tokyo (JP); SAE Magnetics (H.K.) Ltd., Hong Kong (CN)

(*) Notice: Subject to any disclaimer, the term of this patent is extended or adjusted under 35 U.S.C. 154(b) by 134 days.

(21) Appl. No.: 10/465,876

(22) Filed: Jun. 20, 2003

(65) Prior Publication Data
US 2004/0004787 A1    Jan. 8, 2004

(30) Foreign Application Priority Data
Jul. 4, 2002    (JP) .............................. 2002-196351

(51) Int. Cl.
*G11B 5/147* (2006.01)
(52) U.S. Cl. .................................................... 360/126
(58) Field of Classification Search ................. 360/126
See application file for complete search history.

(56) References Cited

U.S. PATENT DOCUMENTS 5,384,680 A * 1/1995 Mallary ....................... 360/126
5,995,341 A * 11/1999 Tanaka et al. ............... 360/125

* cited by examiner

*Primary Examiner*—A. J. Heinz
(74) *Attorney, Agent, or Firm*—Oliff & Berridge, PLC

(57) ABSTRACT

Provided is a thin film magnetic head capable of inhibiting the occurrence of track erasing and improving the reliability of magnetic recording. Two taper surfaces are disposed on both sides of a return yoke layer. As no corner portion which may induce concentration of a magnetic flux exists on the both sides of the return yoke layer, even if the magnetic flux emitted from a pole layer is returned to the return yoke layer through a hard disk, a magnetic field strength is not locally and pronouncedly concentrated in proximity to the taper surfaces of the return yoke layer. Thereby, the concentration of the magnetic flux can be prevented, and the probability of the occurrence of unnecessary recording decreases, so the occurrence of track erasing can be inhibited, and the reliability of magnetic recording can be improved.

6 Claims, 14 Drawing Sheets

THIN FILM MAGNETIC HEAD CAPABLE OF INHIBITING OCCURRENCE OF TRACK ERASING

BACKGROUND OF THE INVENTION

1. Field of the Invention

The present invention relates to a thin film magnetic head magnetically recording by use of, for example, a perpendicular recording system, and a method of manufacturing the same.

2. Description of the Related Art

In recent years, magnetic recording apparatuses such as, for example, hard disk drives which record information on hard disks have been in widespread use as information recording sources. In the development of hard disk drives, an improvement in performance of thin film magnetic heads has been sought in accordance with an increase in the areal density of the hard disks. As magnetic recording systems applicable to thin film magnetic heads, for example, a longitudinal recording system that a signal magnetic field is oriented in an in-plane direction (a longitudinal direction) of a hard disk and a perpendicular recording system that the signal magnetic field is oriented in a direction perpendicular to a surface of the hard disk are well known. At present, the longitudinal recording system is widely used, but in consideration of market forces in accordance with an improvement in areal density, the perpendicular recording system instead of the longitudinal recording system holds promise for future, because the perpendicular recording system can obtain an advantage that higher liner recording density can be achieved, and a recording medium in which data has been already recorded has resistance to thermal decay effects.

As recording modes using the perpendicular recording system, for example, a mode in which recording on a single layer hard disk is performed by a main part through using a head (ring type head) facing each other with a gap in between on a side of an end and being magnetically coupled to each other on a side of the other end, or a mode in which recording on a two-layer hard disk is performed by a main part through using a head (single-pole type head) being disposed perpendicular to the hard disk has been proposed. In these modes, based upon a point that the mode using a combination of the single-pole type head and the two-layer hard disk has superior resistance to thermal decay, the mode becomes a focus of attention as a mode which can improve the performance of thin film magnetic heads.

The perpendicular recording system thin film magnetic head comprises a single-pole type head and a thin film coil generating a magnetic flux. The single-pole type head includes a pole layer emitting the magnetic flux generated by the thin film coil toward the hard disk, and a return magnetic layer where the magnetic flux emitted from the pole layer to magnetize the hard disk is returned, and an end surface of the pole layer and an end surface of the return magnetic layer are exposed to an air bearing surface (recording-medium-facing surface) facing the hard disk. The return magnetic layer is magnetically coupled to the pole layer, for example, on a side away from the air bearing surface, and is generally called "return yoke".

In the perpendicular recording system thin film magnetic head, in a state in which the single-pole type head faces the hard disk, when the magnetic flux generated by the thin film coil is emitted from the pole layer toward the hard disk, the magnetic flux is returned to the return magnetic layer through the hard disk. At this time, a perpendicular magnetic field for recording is generated by the magnetic flux emitted from the pole layer, and the perpendicular magnetic field magnetizes the hard disk so as to record information on the hard disk.

In order to improve recording performance of the perpendicular recording system thin film magnetic head, for example, it is required to inhibit an influence of a problem called "track erasing" as much as possible. Track erasing mainly means a phenomenon in which during recording to a target track on the hard disk, information recorded on other tracks except for the target track is erased without intention. When track erasing occurs, information cannot be stably recorded on the hard disk, so the reliability of magnetic recording decreases.

However, in a conventional perpendicular recording system thin film magnetic head, measures to inhibit the occurrence of track erasing mainly resulting from a returning mechanism of the magnetic flux during recording is not sufficient yet.

SUMMARY OF THE INVENTION

In view of the foregoing, it is an object of the invention to provide a thin film magnetic head capable of inhibiting the occurrence of track erasing and improving the reliability of magnetic recording.

A thin film magnetic head according to the invention comprises a thin film coil generating a magnetic flux, a pole layer having a pole end surface exposed to a recording-medium-facing surface facing a recording medium, and emitting the magnetic flux generated by the thin film coil from the pole end surface toward the recording medium, and a return magnetic layer where the magnetic flux emitted from the pole layer to magnetize the recording medium is returned, wherein the return magnetic layer includes an end surface exposed to the recording-medium-facing surface and a width change portion with a width continuously narrowed toward the end surface.

In the thin film magnetic head according to the invention, the return magnetic layer includes a width change portion with a width continuously narrowed toward the end surface exposed to the recording-medium-facing surface, and includes no corner portion in a width direction in proximity to the recording-medium-facing surface, so local concentration of the returned magnetic flux resulting from the existence of the corner portion can be prevented.

In a method of manufacturing a thin film magnetic head according to the invention, the thin film magnetic head comprises a thin film coil generating a magnetic flux, a pole layer having a pole end surface exposed to a recording-medium-facing surface facing a recording medium and emitting the magnetic flux generated by the thin film coil from the pole end surface toward the recording medium, and a return magnetic layer where the magnetic flux emitted from the pole layer to magnetize the recording medium is returned, and the method comprises the steps of forming a precursor return magnetic layer as a preparatory layer of the return magnetic layer so as to include a precursor width change portion with a continuously narrowed width, and polishing a laminate including the precursor return magnetic layer until reaching a halfway point of the precursor width change portion so as to form the recording-medium-facing surface, thereby forming the return magnetic layer so as to have an end surface exposed to the recording-medium-facing surface and include a width change portion with a width continuously narrowed toward the end surface.

In the method of manufacturing the thin film magnetic head according to the invention, after a precursor return magnetic layer as a preparatory layer of the return magnetic layer is formed so as to include a precursor width change portion with a continuously narrowed width, the precursor return magnetic layer is polished at least until reaching a halfway point of the precursor width change portion so as to form the recording-medium-facing surface, thereby the return magnetic layer is formed so as to have an end surface exposed to the recording-medium-facing surface and include a width change portion with a width continuously narrowed toward the end surface.

In the thin film magnetic head according to the invention, the width of the width change portion is preferably narrowed from both sides. In this case, it is preferable that the width change portion has taper surfaces on both sides, and an angle between each of the taper surfaces and the recording-medium-facing surface is within a range from 5° to 40°.

Moreover, the thin film magnetic head according to the invention may further comprise a first shield layer magnetically shielding the pole layer from its surroundings, wherein the first shield layer includes a portion with a width continuously narrowed from a predetermined position on a side away from the recording-medium-facing surface toward recording-medium-facing surface.

The thin film magnetic head according to the invention may further comprise a magnetoresistive device and a second shield layer magnetically shielding the magnetoresistive device from its surroundings, wherein the second shield layer includes a portion with a width continuously narrowed from a predetermined position on a side away from the recording-medium-facing surface toward the recording-medium-facing surface.

Further, in the thin film magnetic head according to the invention, the pole layer may emit a magnetic flux for magnetizing the recording medium in a direction perpendicular to a surface of the recording medium.

Other and further objects, features and advantages of the invention will appear more fully from the following description.

DETAILED DESCRIPTION OF THE PREFERRED EMBODIMENTS

Preferred embodiments of the invention will be described in more detail below referring to the accompanying drawings.

Figure 1:
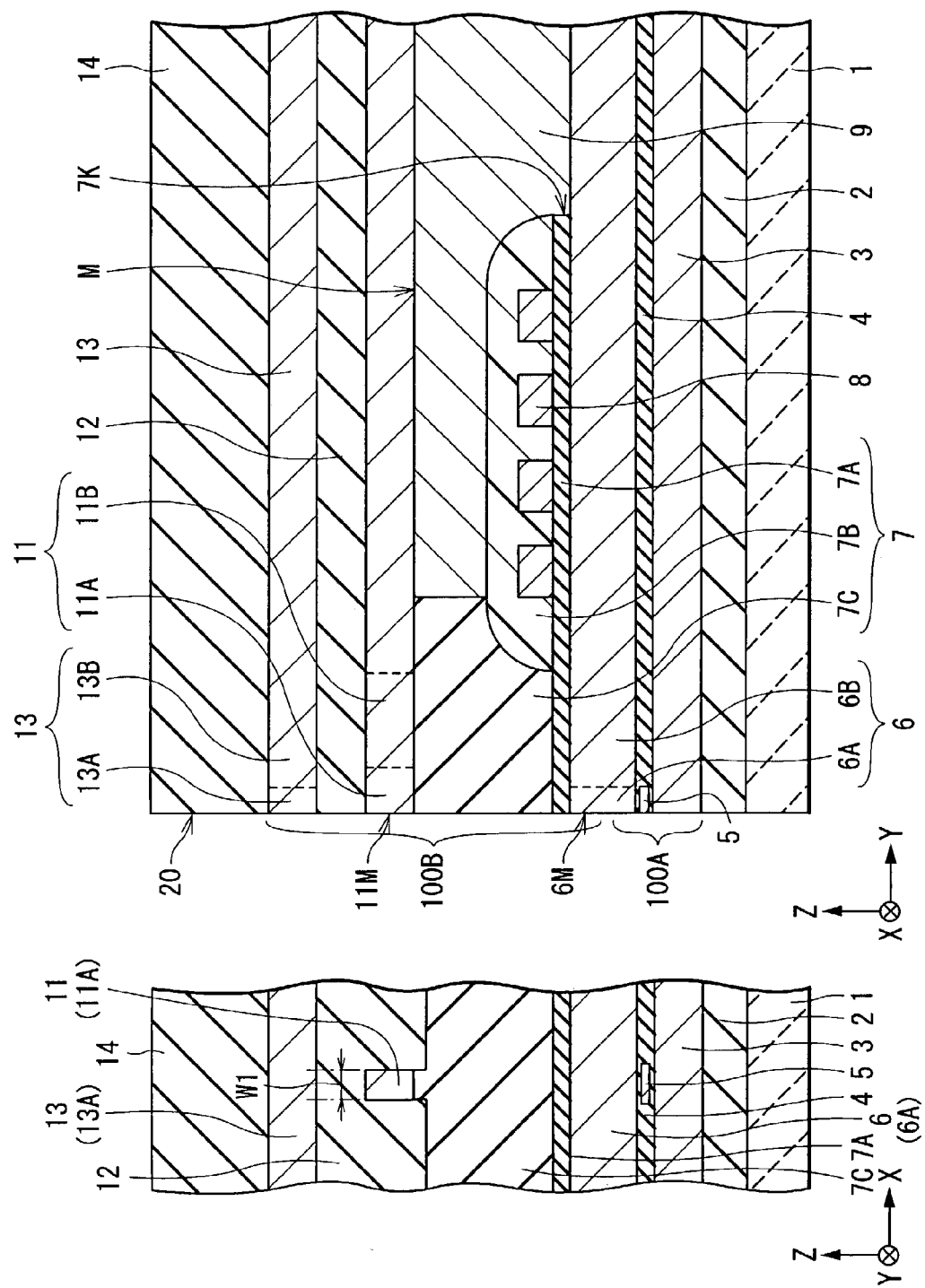
FIGS. 1A and 1B are sectional views of a thin film magnetic head according to an embodiment of the invention.

At first, referring to FIGS. 1A and 1B, the structure of a thin film magnetic head according to an embodiment of the invention will be described below. FIGS. 1A and 1B show sectional views of the thin film magnetic head, and FIG. 1A shows a sectional view parallel to an air bearing surface, and FIG. 1B shows a sectional view perpendicular to the air bearing surface.

In the following description, a distance in an X-axis direction, a distance in a Y-axis direction and a distance in a Z-axis direction in FIGS. 1A and 1B are expressed as "a width", "a length" and "a thickness", respectively. Further a side closer to an air bearing surface in the Y-axis direction is expressed as "front or frontward", and the opposite side is expressed as "rear or rearward". In FIGS. 2 through 16, these directions are expressed as the same.

The thin film magnetic head according to the embodiment is mounted in, for example, a magnetic recording apparatus such as a hard disk drive or the like as a device for magnetic recording. The thin film magnetic head is, for example, a composite head capable of implementing two functions of recording and reproducing, and as shown in FIGS. 1A and 1B, the thin film magnetic head comprises an insulating layer 2 made of, for example, aluminum oxide ($Al_2O_3$; hereinafter simply referred to as "alumina"), a reproducing head portion 100A using a magnetoresistive (MR) effect to perform reproducing, a recording head portion 100B performing recording by a perpendicular recording system and an overcoat layer 14 made of, for example, alumina or the like laminated in this order on a substrate 1 made of, for example, a ceramic material such as AlTiC ($Al_2O_3$.TiC).

The reproducing head portion 100A comprises, for example, a bottom shield layer 3, a shield gap film 4 and a top shield layer-cum-return yoke layer (hereinafter simply referred to as "return yoke layer) 6 laminated in this order. An MR device 5 as a magnetic reproducing device is buried in the shield gap film 4 so that a surface of the MR device 6 is exposed to an air bearing surface 20.

Mainly, the bottom shield layer 3 and the return yoke layer 6 are provided to magnetically shield the MR device 5 from its surroundings. The bottom shield layer 3 and the return yoke layer 6 are made of, for example, a magnetic material such as a nickel iron alloy (NiFe; hereinafter simply referred to as "Permalloy (trade name)"; Ni: 80 wt %, Fe: 20 wt %) with a thickness of approximately 1.0 μm to 2.0 μm.

The shield gap film 4 is provided to magnetically and electrically separate the MR device 5 from the bottom shield layer 3 and the return yoke layer 6. The shield gap film 4 is made of, for example, a non-magnetic and non-conductive material such as alumina with a thickness of approximately 0.1 μm to 0.2 μm.

The MR device 5 uses, for example, a giant magnetoresistive (GMR) effect or a tunneling magnetoresistive (TMR) effect to perform reproducing. Herein, the MR device 5 corresponds to a specific example of "a magnetoresistive device" in the invention.

The recording head portion 100B comprises, for example, a return yoke layer 6, a gap layer 7 and a yoke layer 9 in which a thin film coil 8 is buried, a pole layer 11 magnetically coupled to the return yoke layer 6 through an aperture 7K disposed in the gap layer 7 and the yoke layer 9, an insulating layer 12 and a write shield layer 13 laminated in this order.

As described above, the return yoke layer 6 has a function of magnetically shielding the MR device 5 from its surrounding in the reproducing head portion 10A, and a function of returning a magnetic flux emitted from the pole layer 11 through a hard disk (not shown) in the recording head portion 100B. The return yoke layer 6 is made of, for example, a magnetic material such as Permalloy (Ni: 80 wt %, Fe: 20 wt %) or the like with a thickness of approximately 1.0 μm to 4.0 μm. Herein, the return yoke layer 6 corresponds to a specific example of "a return magnetic layer" in the invention.

The gap layer 7 includes a gap layer portion 7A disposed on the return yoke layer 6 and having the aperture 7K, a gap layer portion 7B disposed on the gap layer portion 7A so that gaps between windings of the thin film coil 8 and their surroundings are coated with the gap layer portion 7B, and a gap layer portion 7C disposed so that the gap layer portions 7A and 7B are partially coated with the gap layer portion 7C.

The gap layer portion 7A is made of, for example, a non-magnetic and non-conductive material such as alumina or the like with a thickness of approximately 0.1 μm to 1.0 μm. The gap layer portion 7B is made of, for example, a photoresist (photosensitive resin) exhibiting liquidity by heating, a spin-on glass (SOG) exhibiting liquidity by heating or the like. The gap layer portion 7C is made of, for example, a non-magnetic and non-conductive material such as alumina, silicon oxide ($SiO_2$) or the like with a larger thickness than that of the gap layer portion 7B.

The thin film coil 8 is provided mainly to generate a magnetic flux for recording. The thin film coil 8 is made of, for example, a high-conductive material such as copper (Cu) or the like, and has a winding structure in a spiral shape while regarding a coupling portion between the return yoke layer 6 and the yoke layer 9 as a center. In FIGS. 1A and 1B, only a part of a plurality of windings constituting the thin film coil 8 is shown.

The yoke layer 9 is provided to magnetically couple the return yoke layer 6 to the pole layer 11, and is made of, for example, a magnetic material such as Permalloy (Ni: 80 wt %, Fe: 20 wt %) or the like. For example, the position of a surface of the yoke layer 9 in a thickness direction coincides with the position of a surface of the gap layer portion 7C in the same direction, that is, the surfaces of the yoke layer 9 and the gap layer portion 7C constitute a flat surface M.

The pole layer 11 is provided mainly to contain the magnetic flux generated by the thin film coil 8 and emit the magnetic flux toward the hard disk (not shown). The pole layer 11 is made of, for example, an iron cobalt alloy (FeCo), an iron-based alloy (Fe-M; M represents a metal element selected from Groups 4A, 5A, 6A, 3B and 4B), a nitride of any of these alloys, or the like with a thickness of approximately 0.1 μm to 0.5 μm.

Mainly, the insulating layer 12 is provided to magnetically and electrically separate the pole layer 11 from the write shield layer 13, and is made of, for example, a non-magnetic and non-conductive material such as alumina or the like.

Mainly, the write shield layer 13 is provided to magnetically shield the pole layer 11 from its surroundings. The write shield layer 13 is made of, for example, a magnetic material such as Permalloy (Ni: 80 wt %, Fe: 20 wt %) with a thickness of approximately 1.0 μm to 2.0 μm. Herein, the write shield layer 13 corresponds to a specific example of "a first shield layer" in the invention.

Figure 2:
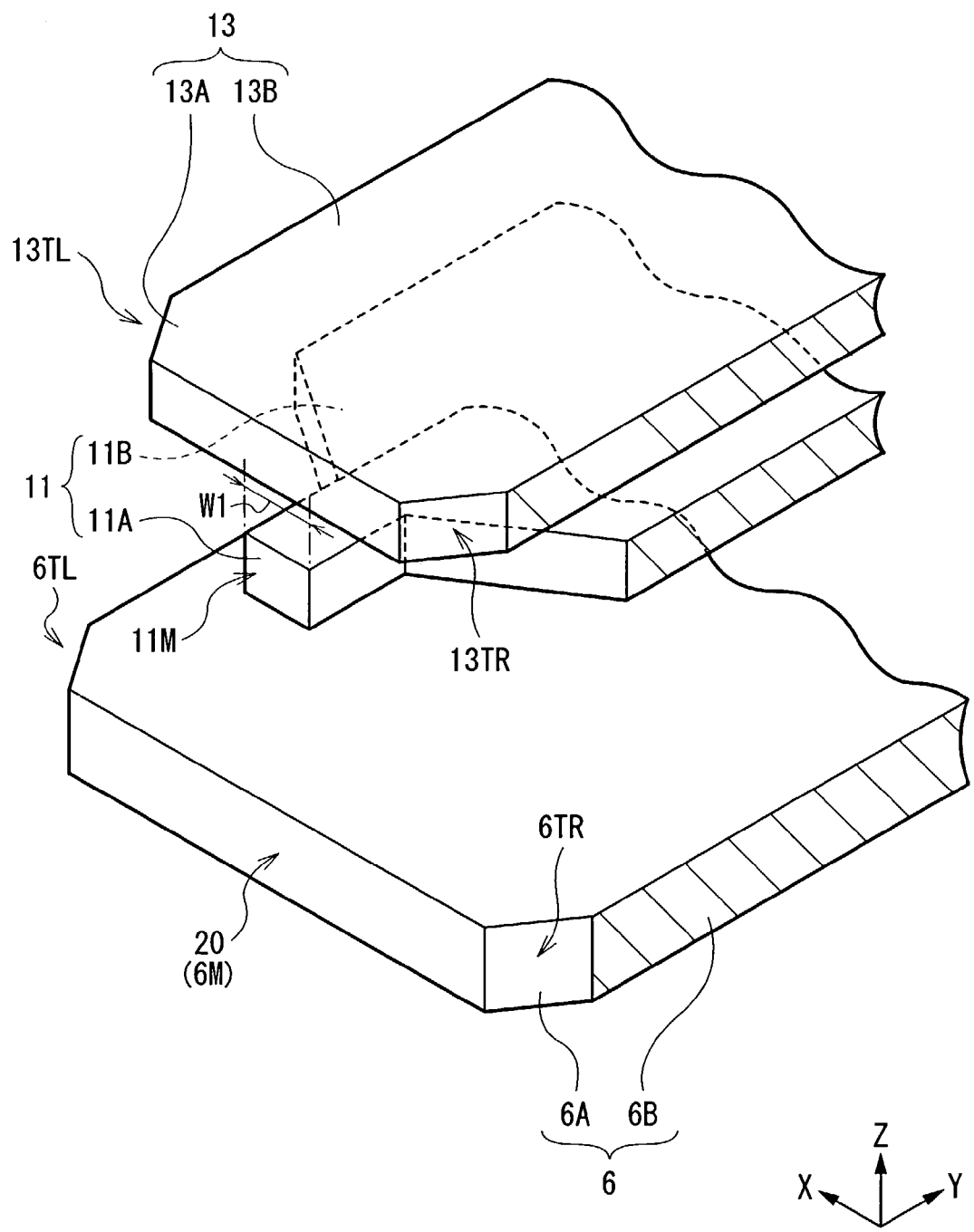
FIG. 2 is a enlarged perspective view of a main part of the thin film magnetic head shown in FIGS. 1A and 1B.
Figure 3:
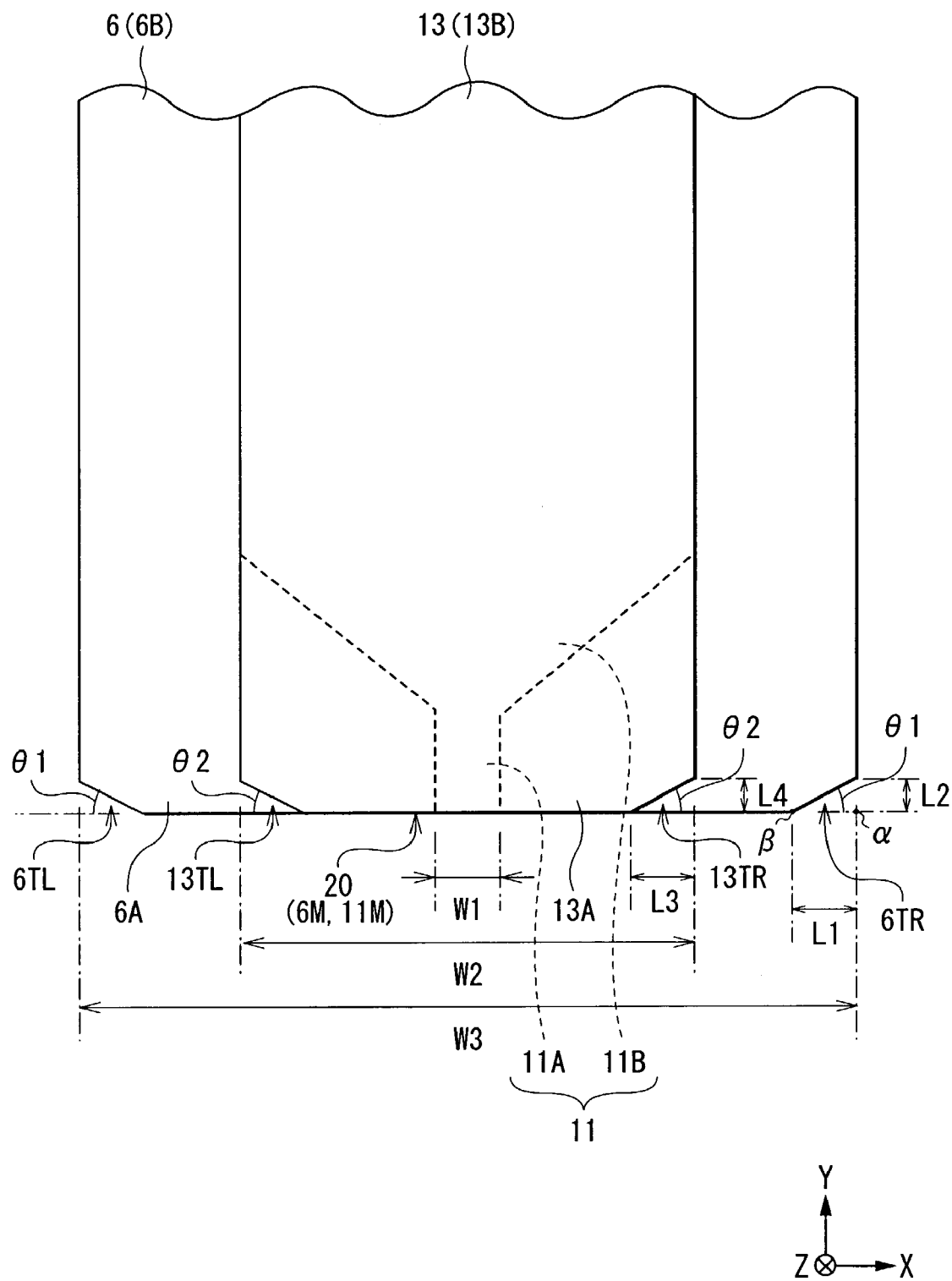
FIG. 3 is an enlarged plan view of the main part of the thin film magnetic head shown in FIGS. 1A and 1B.

Next, referring to FIGS. 2 and 3, the structure of a main part of the thin film magnetic head will be described in more detail below. FIG. 2 shows an enlarged perspective view of the main part of the thin film magnetic head shown in FIGS. 1A and 1B, and FIG. 3 shows a plan view of the main part of the thin film magnetic head.

An end surface of the return yoke layer 6, an end surface of the pole layer 11 and an end surface of the write shield layer 13 are exposed to the air bearing surface 20. In other words, the pole layer 11 has an exposed surface 11M, and the return yoke layer 6 has an exposed surface 6M. Herein, the exposed surface 11M corresponds to a specific example of "a pole end surface" of the pole layer in the invention, and the exposed surface 6M corresponds to a specific example of "an end surface" of the return magnetic layer in the invention.

The pole layer 11 includes a front end portion 11A with a minute uniform width W1 determining a recording track width on the hard disk and a rear end portion 11B coupled to the front end portion 11A in this order from a side closer to the air bearing surface 20. The rear end portion 11B has a width W2 which is larger than the width W1 of the front end portion 11A (W2>W1) in a rear portion, and a gradually narrowed width in a front portion.

The return yoke layer 6 has a substantially rectangular shaped structure including a portion with a width continuously narrowed toward the exposed surface 6M. More specifically, the return yoke layer 6 includes, for example, a front portion 6A having two taper surfaces 6TR and 6TL on both sides to narrow the width of the front portion 6A from the both sides, and a rear portion 6B having a larger uniform width W3 (W3>W2) than the width W2 of the rear end portion 11B of the pole layer 11 in order from a side closer to the air bearing surface 20. A taper angle $\theta 1$ between each of the taper surfaces 6TR and 6TL in the front portion 6A and the air bearing surface 20 is preferably within a range approximately from 5° to 40°, and more preferably within a range approximately from 10° to 30°. Herein, the front portion 6A of the return yoke layer 6 corresponds to a specific example of "a width change portion" in the invention.

The write shield layer 13 has, for example, substantially the same structure as the return yoke layer 6, and includes a front portion 13A having two taper surfaces 13TR and 13TL on both side to narrow the width of the front portion 13A from the both sides, and a rear portion 13B having the same width as the width W2 of the rear end portion 11B of the pole layer 11 in order from a side closer to the air bearing surface 20. A taper angle $\theta 2$ between each of the taper surfaces 13TR and 13TL in the front portion 13A and the air bearing surface 20 is, for example, equivalent to the taper angle $\theta 1$.

As a specific example of dimensions, for example, assuming that the width W3 of the return yoke layer 6 is approximately 88.0 μm, and the width W2 of the write shield layer 13 is approximately 72.0 μm, (1) in the case where the taper angles θ1 and θ2 are approximately 5°, a width L1 and a length L2 of the taper surface 6TR (or 6TL) are approximately 2.0 μm and approximately 0.17 μm, respectively, and a width L3 and a length L4 of the taper surface 13TR (or 13TL) are approximately 2.0 μm and approximately 0.17 μm, respectively, and (2) in the case where the taper angles θ1 and θ2 are approximately 40°, the width L1 and the length L2 of the taper surface 6TR (or 6TL) are approximately 2.0 μm and approximately 1.7 μm, respectively, and the width L3 and the length L4 of the taper surface 13TR (or 13TL) are approximately 2.0 μm and approximately 1.7 μm, respectively.

Figure 4:
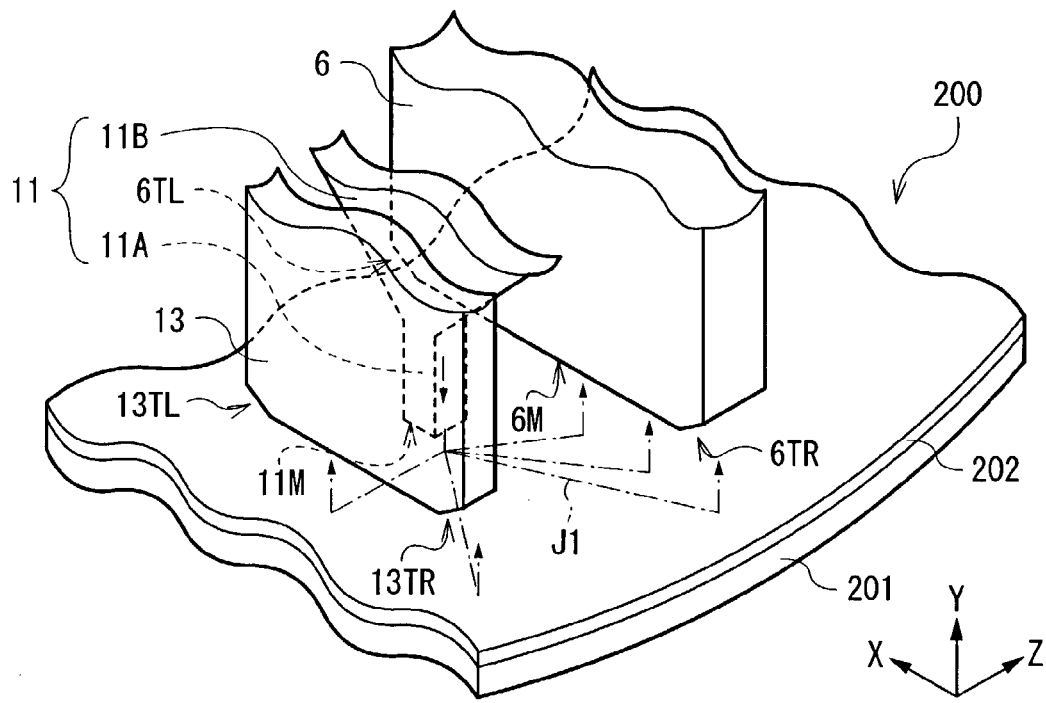
FIG. 4 is an illustration for describing the flow of a magnetic flux during recording by the thin film magnetic head according to the embodiment of the invention.

Next, referring to FIG. 4, the structure of a hard disk on which information is recorded by using the thin film magnetic head will be described below. FIG. 4 is an illustration for describing the flow of the magnetic flux during recording by the thin film magnetic head, and shows the hard disk together with the thin film magnetic head.

A hard disk 200 in which a main part has a two-layer structure is for perpendicular recording. The hard disk 200 comprises a back layer 201 and a recording layer 202 laminated in this order on a base disk (not shown). The back layer 201 is provided mainly to form a guide path for a magnetic flux in the hard disk 200, and is made of, for example, a soft magnetic layer with high magnetic permeability. The recording layer 202 is a layer on which information is recorded, and is made of a magnetic material on which information can be recorded by use of magnetization based upon a perpendicular magnetic field.

Next, referring to FIGS. 1A through 4, actions of the thin film magnetic head will be described below.

In the thin film magnetic head, in recording information, when a current flows into the thin film coil 8 of the recording head portion 100B through an external circuit (not shown), a magnetic flux J1 is generated by the thin film coil 8. After the magnetic flux J1 generated at this time is contained in the pole layer 11 through the yoke layer 9 and is emitted from the exposed surface 11M of the pole layer 11 toward the recording layer 202 of the hard disk 200, the magnetic flux J1 is returned from the exposed surface 6M to the return yoke layer 6 through the back layer 201. At this time, the magnetic flux J1 emitted from the pole layer 11 generates a magnetic field (perpendicular magnetic field) for magnetizing the recording layer 202 in a direction perpendicular to a surface of the recording layer 202. Then, the perpendicular magnetic field magnetizes the recording layer 202 so as to record information on the hard disk 200.

On the contrary, in reproducing, when a sense current flows into the MR device 5 of the reproducing head portion 100A, the resistance of the MR device 5 is changed depending upon a signal magnetic field for reproducing which is generated from the recording layer 202 of the hard disk 200. A change in the resistance is detected as a change in the sense current so that the information recorded on the hard disk 200 is read out.

In the thin film magnetic head according to the embodiment, two taper surfaces 6TR and 6TL are disposed on the both sides of the return yoke layer 6, so because of the following reason, the occurrence of track erasing can be inhibited, and the reliability of magnetic recording can be improved.

Figure 5:
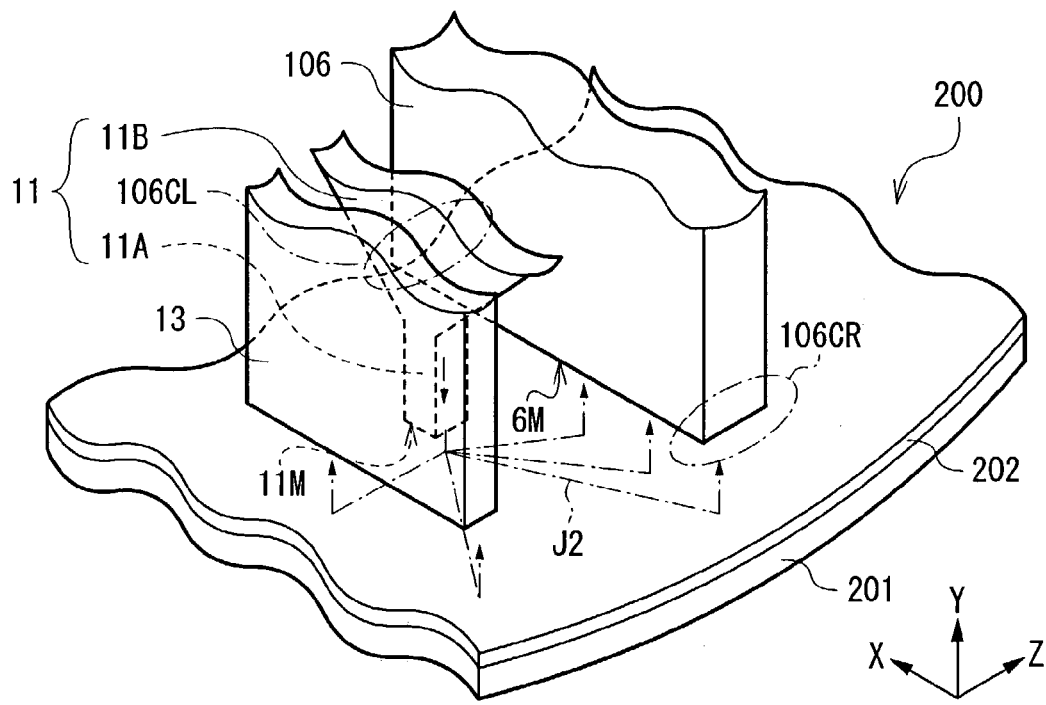
FIG. 5 is an illustration for describing the flow of a magnetic flux during recording by a conventional thin film magnetic head.
Figures 6, 7:
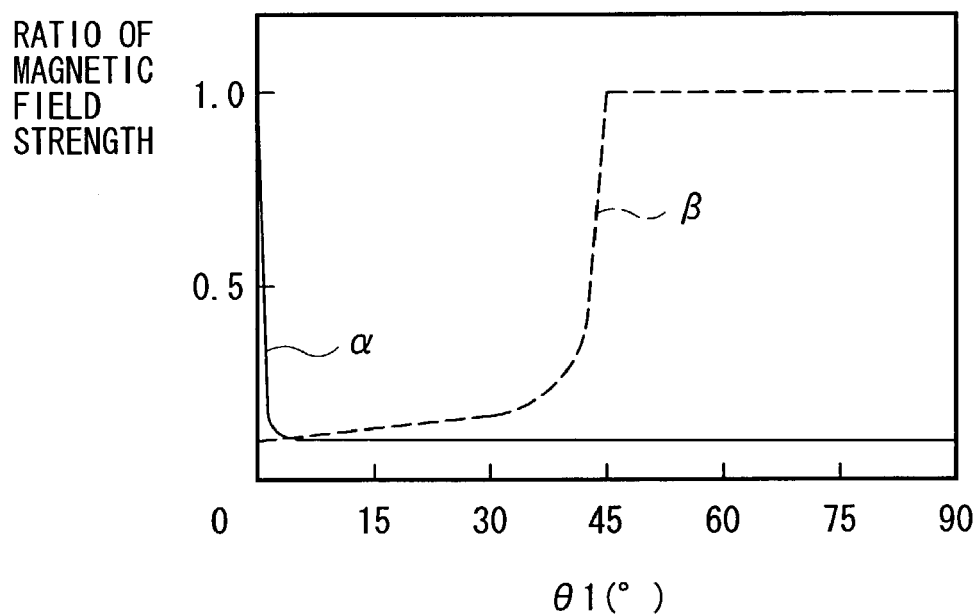
FIG. 6 is an illustration schematically showing results of measurement relating to a correlation between the shape of a return yoke layer and the magnetic field strength.
FIG. 7 is a graph showing a taper angle dependence of a ratio of the magnetic field strength.

FIG. 5 is an illustration for describing the flow of a magnetic flux during recording by a conventional thin film magnetic head, and corresponds to FIG. 4. FIG. 6 schematically shows results of measurement relating to a correlation between the shape of the return yoke layer (in the conventional thin film magnetic head having no taper surface, and the thin film magnetic head according to the invention (the embodiment) having the taper surfaces) and magnetic field strength. In the conventional thin film magnetic head, for example, a return yoke layer 106 has the same structure as that of the return yoke layer 6 in the thin film magnetic head according to the embodiment, except that the taper surfaces 6TR and 6TL are not disposed on the return yoke layer 106, and the return yoke layer 106 has a perfect rectangular shape having two corner portions 106CR and 106CL.

The conventional thin film magnetic head (refer to FIG. 5) can perform magnetic recording as in the case of the thin film magnetic head according to the embodiment. More specifically, during recording information, a magnetic flux J2 emitted from the pole layer 11 is returned to the return yoke layer 106 through the hard disk 200. However, in the thin film magnetic head, when the magnetic flux J2 is returned to the return yoke layer 106, the returned magnetic flux J2 is locally concentrated on the corner portions 106CR and 106CL of the return yoke layer 106. Therefore, as shown in columns of "conventional thin film magnetic head" in FIG. 6, the magnetic field strength is locally and pronouncedly increased in proximity to the corner portions 106CR and 106CL. As a result, a perpendicular magnetic field is generated by not only the magnetic flux J2 emitted from the pole layer 11 but also the returned magnetic flux J2 concentrated on the corner portions 106CR and 106CL of the return yoke layer 106 without intention, so unnecessary recording is performed on the hard disk 200, thereby resulting in the occurrence of track erasing. Therefore, the reliability of magnetic recording decreases.

On the other hand, in the thin film magnetic head according to the embodiment (refer to FIG. 4), the taper surfaces 6TR and 6TL are disposed on the return yoke layer 6, and no corner portion which may induce concentration of the magnetic flux J1 is disposed on the return yoke layer 6, so as shown in columns of "thin film magnetic head of invention" in FIG. 6, the magnetic filed strength is not locally and pronouncedly concentrated in proximity to the taper surfaces 6TR and 6TL of the return yoke layer 6. Therefore, in the embodiment, the concentration of the returned magnetic flux J1 which causes a problem in the conventional thin film magnetic head can be prevented, thereby, the probability of the occurrence of unnecessary recording decreases, so the occurrence of track erasing can be inhibited, and the reliability of magnetic recording can be improved.

Specifically, in the embodiment, the taper angle θ1 between each of the taper surfaces 6TR and 6TL of the return yoke layer 6 and the air bearing surface 20 is preferably within a range of from 5° to 40°, and more preferably within a range from 10° to 30°, so local concentration of the returned magnetic flux which induces track erasing can be effectively prevented. This is obvious from the result of an experiment shown in FIG. 7 and the following viewpoint. FIG. 7 shows a taper angle dependence of a ratio of the magnetic field strength, and a "vertical axis" indicates a ratio of a magnetic field strength when a magnetic field strength in proximity to the taper surface 6TR (θ1=0°) is 1, and a "lateral axis" indicates the taper angle θ1. Curves α and β in FIG. 7 show changes in the ratio of the magnetic field strength in corresponding positions α and β shown in FIG. 3. As can be seen from FIG. 7, the ratio of the magnetic filed strength in the position α pronouncedly decreases when the taper angle θ1 is approximately 2° or over. On the other hand, the ratio of the magnetic field strength in the position β pronouncedly decreases when the taper angle θ1 is approximately 45° or less. Accordingly, it is confirmed that when the taper angle θ1 is within a range from 5° to 40°, an acceptable ratio of the magnetic field strength (approximately 0.3) is obtained, and more specifically, when the taper angle θ1 is within a range of from 5° to 30°, an adequate ratio of the magnetic field strength (approximately 0.18) is obtained. However, when the processing accuracy of the minute taper surfaces 6TR and 6TL disposed on the return yoke layer 6 is considered, the lower limit of the taper angle θ1 is preferably around 10°, so a practically adequate range of the taper angle θ1 is from 10° to 30°.

Moreover, in the embodiment, like the return yoke layer 6, two taper surfaces 13TR and 13TL are disposed on the both sides of the write shield layer 13, so in this point of view, the occurrence of track erasing can be inhibited because of the following reason. As described above, unlike the return yoke layer 6, the write shield layer 13 fundamentally has a function of magnetically shielding the pole layer 11 from its surroundings, but the write shield layer 13 is made of the same magnetic material as the return yoke layer 6, so during actual recording, for example, as shown in FIG. 4, the magnetic flux J1 emitted from the pole layer 11 may be returned to not only the return yoke layer 6 but also the write shield layer 13. In this case, when the write shield layer 13 has a perfect rectangular shape and corner portions on both sides thereof, local concentration of the magnetic flux J1 as in the case of the return yoke layer 106 of the conventional thin film magnetic head shown in FIG. 5 occurs resulting from the existence of the corner portions, so the possibility of the occurrence of track erasing increases resulting from the concentration of the magnetic flux J1. However, in the embodiment, the write shield layer 13 has the taper surfaces 13TR and 13TL, so the concentration of the magnetic flux J1 can be prevented by the same effect as in the case where the return yoke layer 6 has the taper surfaces 6TR and 6TL, thereby, the occurrence of track erasing by the write shield layer 13 can be inhibited.

Figure 8:
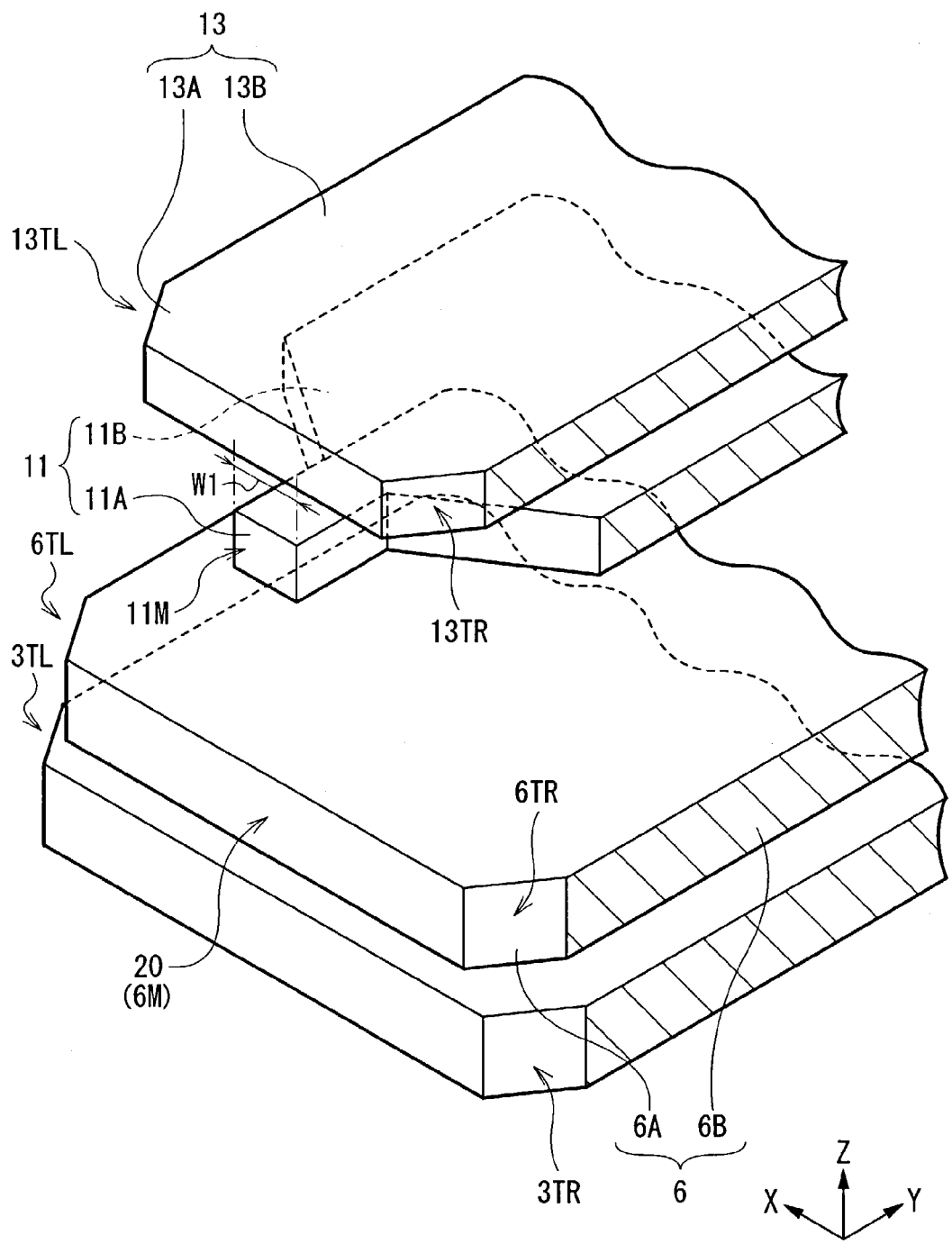
FIG. 8 is a plan view of a modification of the thin film magnetic head according to the embodiment of the invention.

In the embodiment, in addition to the return yoke layer 6, the write shield layer 13 is tapered, but it is not necessarily limited to this. As in the case of the write shield layer 13, any other part where the magnetic flux J1 may be returned during actual recording may be tapered. More specifically, for example, as shown in FIG. 8, the bottom shield layer 3 is made of the same magnetic material as the write shield layer 13, so the magnetic flux J1 may be returned to the bottom shield layer 3. Therefore, the bottom shield layer 3 may be tapered to have taper surfaces 3TR and 3TL on both sides. Also in this case, the concentration of the magnetic flux J1 can be prevented by the same effect as in the case where the taper surfaces 13TR and 13TL are disposed on the write shield layer 13, so the occurrence of track erasing by the bottom shield layer 3 can be inhibited. Further, the structure of a main part of the thin film magnetic head shown in FIG. 8 is the same as in the case shown in FIG. 2, except for the above-described characteristic part. Herein, the bottom shield layer 3 having the taper surfaces 3TR and 3TL corresponds to a specific example of "a second shield layer" in the invention.

Figure 9:
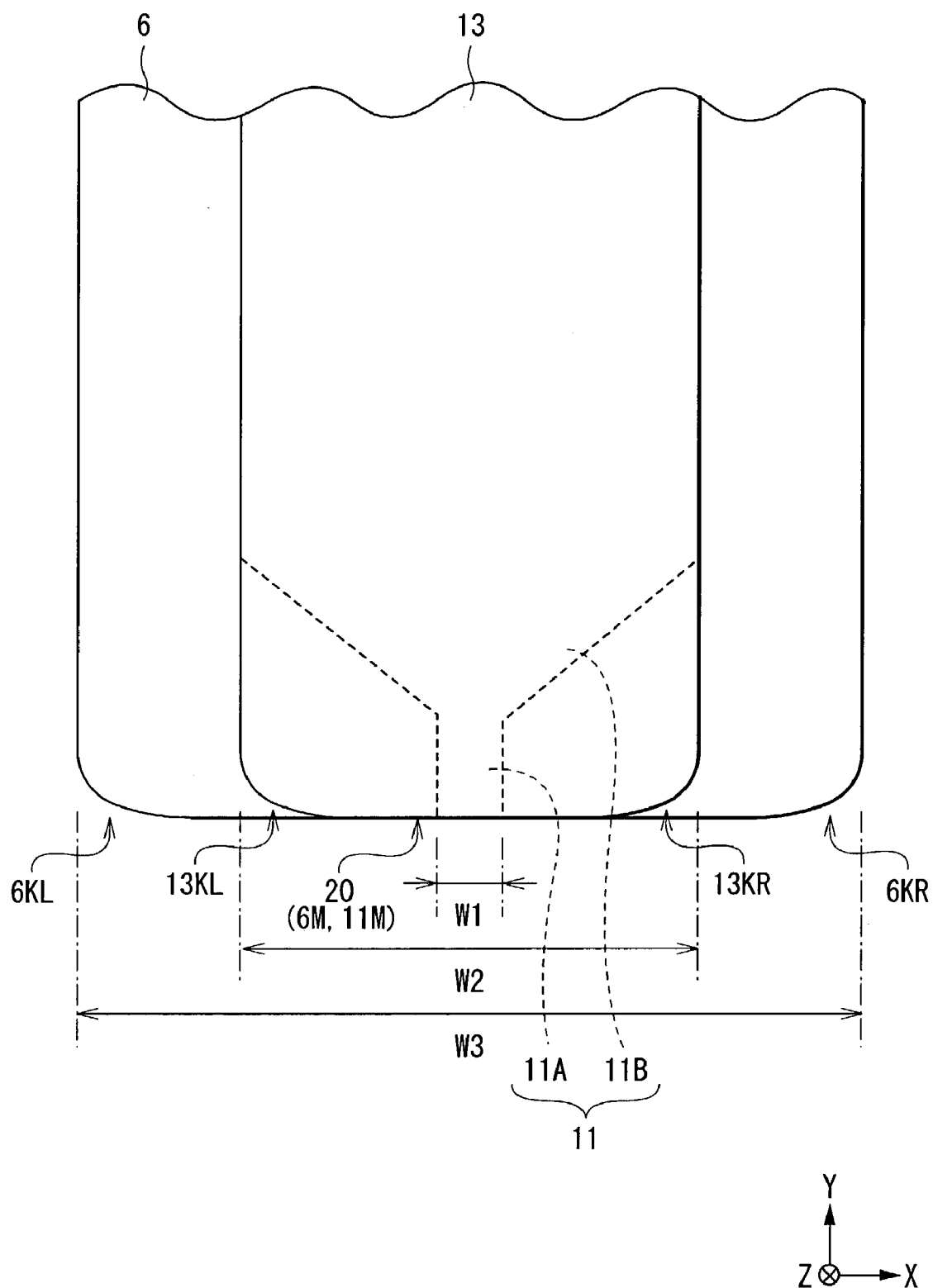
FIG. 9 is a plan view of another modification of the thin film magnetic head according to the embodiment of the invention.

Moreover, in the embodiment, the return yoke layer 6 has flat taper surfaces 6TR and 6TL, but it is not necessarily limited to this. As long as the return yoke layer 6 has a continuously narrowed width in proximity to the air bearing surface 20, the structure of the return yoke layer 6 can be freely modified. More specifically, for example, as shown in FIG. 9, the return yoke layer 6 may have curved surfaces 6KR and 6KL in positions corresponding to the taper surfaces 6TR and 6TL, respectively. Also in this case, the local concentration of the returned magnetic flux on the return yoke layer 6 can be prevented, so the same effect as that in the above embodiment can be obtained. The above modification relating to the structure of the return yoke layer 6 can be applied to not only the return yoke layer 6 but also the write shield layer 13 (13KR and 13KL) or the bottom shield layer 3.

Further, in the embodiment, the return yoke layer 6 has a function of returning the magnetic flux emitted from the pole layer 11 and a function as a top shield layer which magnetically shields the MR device 5 from its surroundings, but it is not necessarily limited to this. For example, in addition to the return yoke layer 6, the top shield layer is disposed, thereby the return yoke layer 6 may independently have a function of returning the magnetic flux, and the top shield layer may independently have a function of magnetically shielding. In this case, for example, a non-magnetic layer is preferably disposed between the return yoke layer 6 and the top shield layer so as to prevent from propagating the magnetic flux between the layers.

Figure 14:
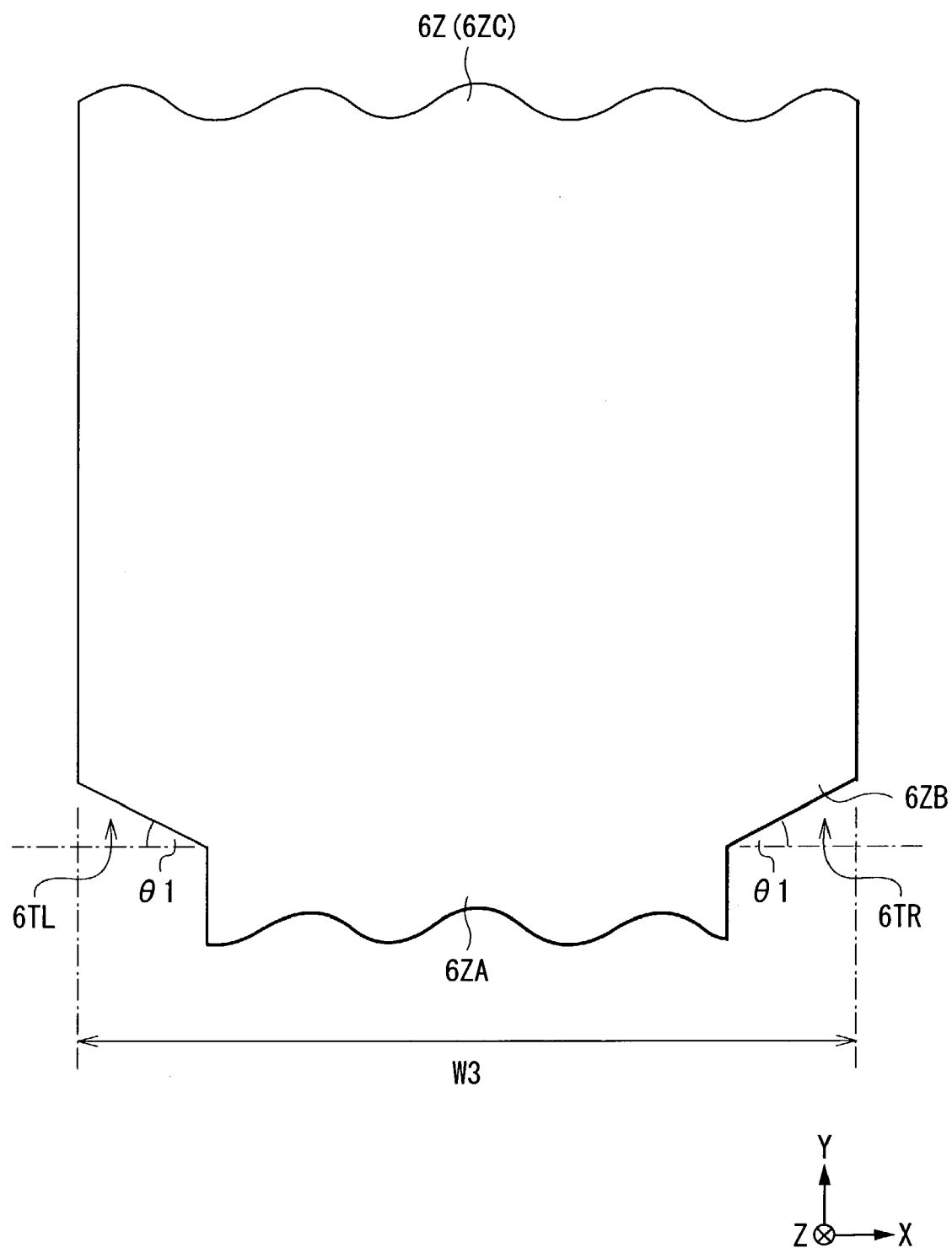
FIG. 14 is a plan view corresponding to the sectional views shown in FIGS. 10A and 10B.
Figure 15:
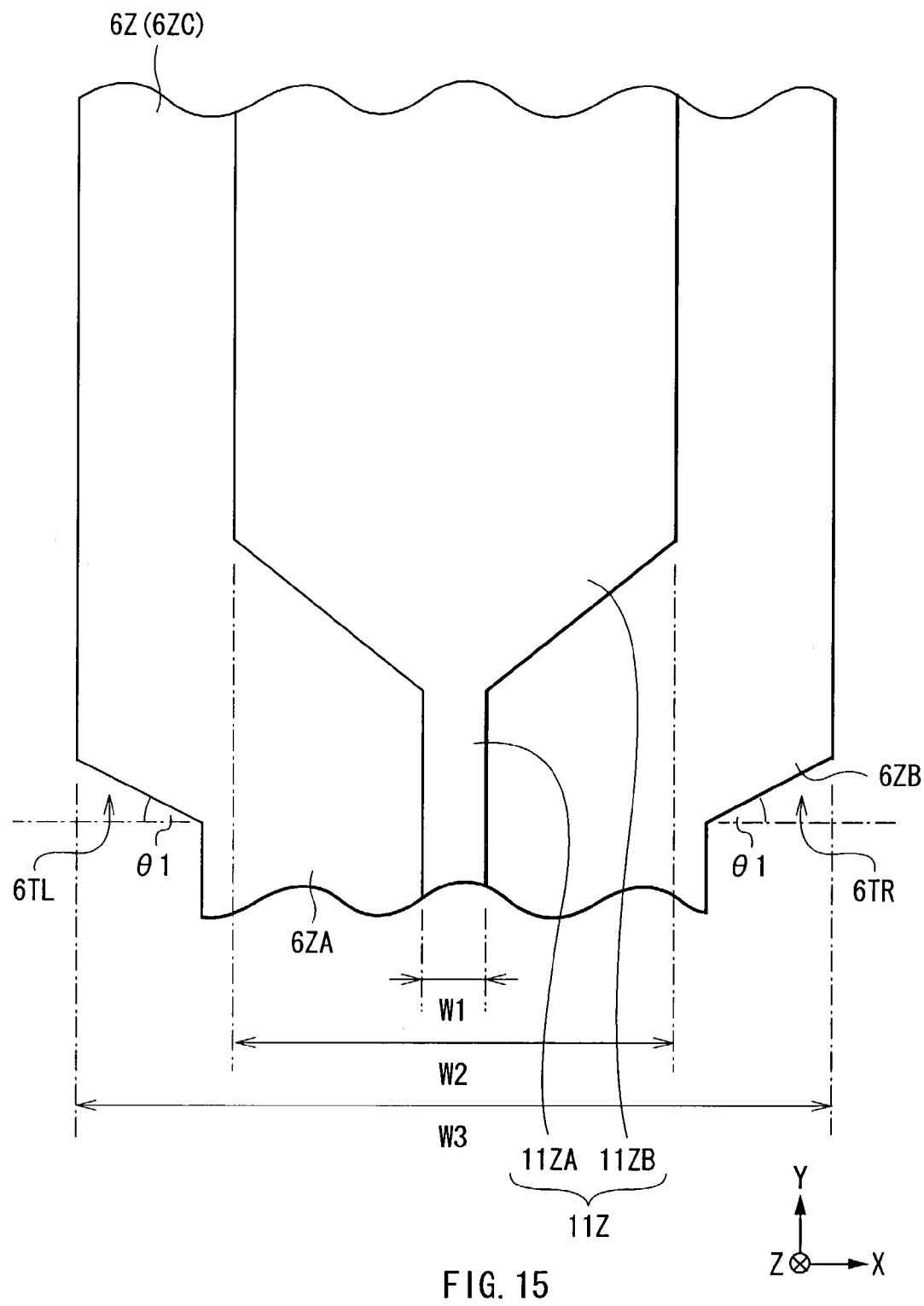
FIG. 15 is a plan view corresponding to the sectional views shown in FIGS. 11A and 11B.
Figure 16:
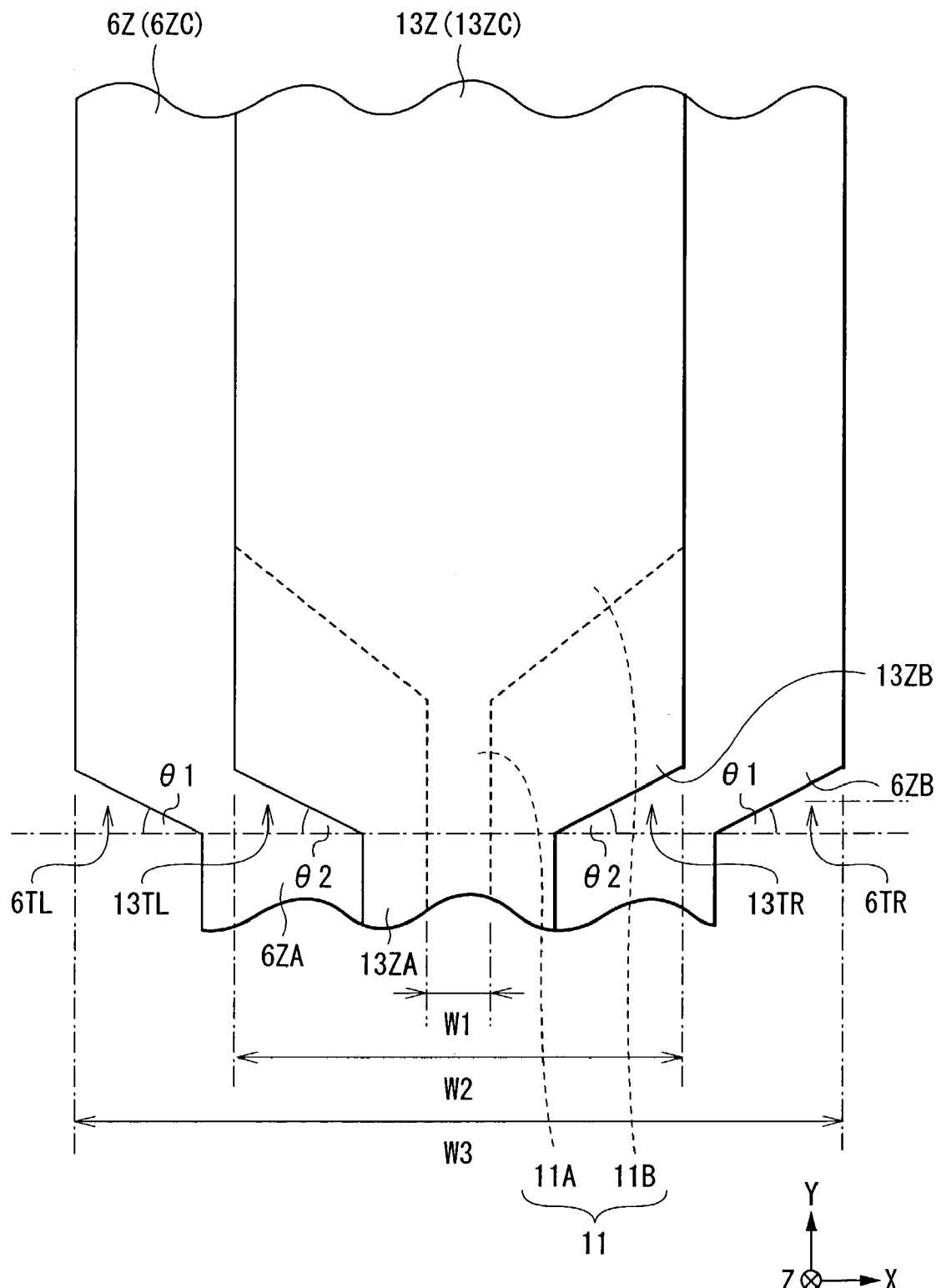
FIG. 16 is a plan view corresponding to the sectional views shown in FIGS. 12A and 12B.

Next, referring to FIGS. 1A through 3, and 10A through 16, a method of manufacturing the thin film magnetic head according to the embodiment will be described below. FIGS. 10A and 10B through 13A and 13B show sectional views of each step in the method of manufacturing the thin film magnetic head, and FIGS. 14 through 16 show plan views of the main part of the thin film magnetic head corresponding to each step in the method of manufacturing the thin film magnetic head shown in FIGS. 10A and 10B through 12A and 12B. The materials, thicknesses and structural characteristics of parts of the thin film magnetic head have been already described above, and will not further described below. Mainly, a method of manufacturing the main part of the thin film magnetic head will be described in detail below.

Figures 10A, 10B:
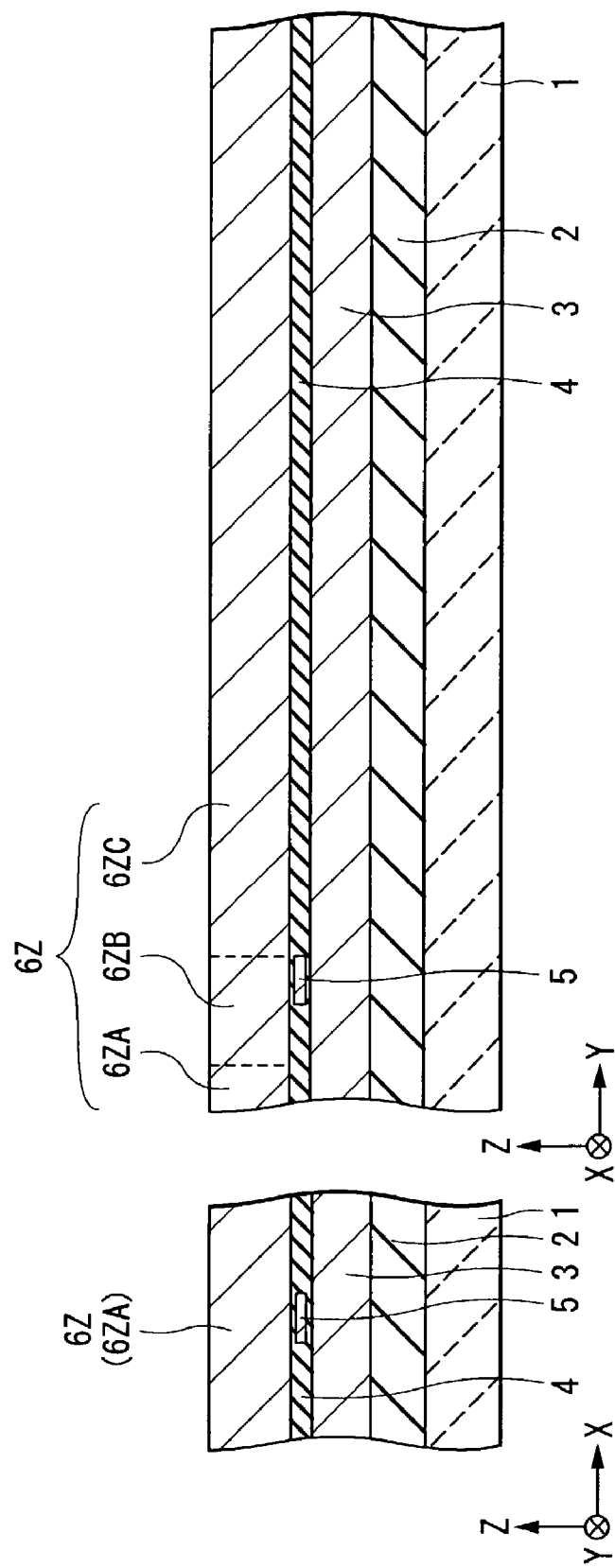
FIGS. 10A and 10B are sectional views for describing one step in a method of manufacturing the thin film magnetic head according to the embodiment of the invention.

The thin film magnetic head can be manufactured by use of, for example, existing thin film processes including film formation techniques such as plating, sputtering or the like, patterning techniques using photolithography, etching or the like, and polishing techniques such as machining, polishing or the like. More specifically, at first, as shown in FIGS. 10A and 10B, after the insulating layer 2 is formed on the substrate 1, the bottom shield layer 3 is selectively formed on the insulating layer 2 by use of, for example, frame plating so as to have a predetermined pattern shape. Frame plating will be described in more detail below.

Next, as shown in FIGS. 10A and 10B, the shield gap film 4 is formed on the bottom shield layer 3 so as to bury the MR device 5.

Then, as shown in FIGS. 10A and 10B, a precursor return yoke layer 6Z is selectively formed on the shield gap film 4 by use of, for example, frame plating. The precursor return yoke layer 6Z is a preparatory layer which becomes the return yoke layer 6 through polishing for forming the air bearing surface 20 in a later step. Hereinafter, a preparatory layer to be polished as in the case of the precursor return yoke layer 6Z is called a "precursor" layer. When the precursor return yoke layer 6Z is formed, for example, as shown in FIG. 14, a rear portion 6ZC with a uniform width W3, a front portion 6ZA with a smaller uniform width than that of the rear portion 6ZC, and a middle portion 6ZB being disposed between the front portion 6ZA and the rear portion 6ZC and having two taper surfaces 6TR and 6TL so as to continuously narrow the width of the middle portion 6ZB toward the front are included. At this time, the taper angle θ1 between each of the taper surfaces 6TR and 6TL of the middle portion 6ZB and the air bearing 20 (refer to FIG. 3; in this case, a surface including the X-axis and the Z-axis)

which will be formed in a later step is preferably within a range approximately from 5° to 40°, and more preferably within a range approximately from 10° to 30°. Herein, the precursor return yoke layer 6Z corresponds to a specific example of "a precursor return magnetic layer" in the invention, and the middle portion 6ZB of the precursor return yoke layer 6Z corresponds to a specific example of "a precursor width change portion" in the invention.

Steps of forming the precursor return yoke layer 6Z by use of frame plating will be described in more detail below. At first, after an electrode film (not shown) which becomes a seed layer for electroplating is formed on the shield gap film 4, for example, a positive photoresist is applied to the electrode film to form a photoresist film. As the material of the electrode film, for example, the same material as that of the precursor return yoke layer 6Z is used. Next, by use of a mask for exposure having a patterned aperture corresponding to a plane shape of the precursor return yoke layer 6Z, the photoresist film is selectively exposed through the patterned aperture, then an exposed region of the photoresist film is developed so as to form a necessary frame pattern for pattern plating. Next, a plating film is selectively grown by use of the frame pattern as a mask and the electrode film formed in a previous step as a seed layer so as to selectively form the precursor return yoke layer 6Z made of the plating film. Finally, after the frame pattern is removed, an unnecessary electrode film and an unnecessary plating film left in a region except for the precursor return yoke layer 6Z are selectively removed by use of, for example, etching so as to complete the steps of forming the precursor return yoke layer 6Z.

Next, the method of manufacturing the thin film magnetic head will be described below.

Figures 11A, 11B:
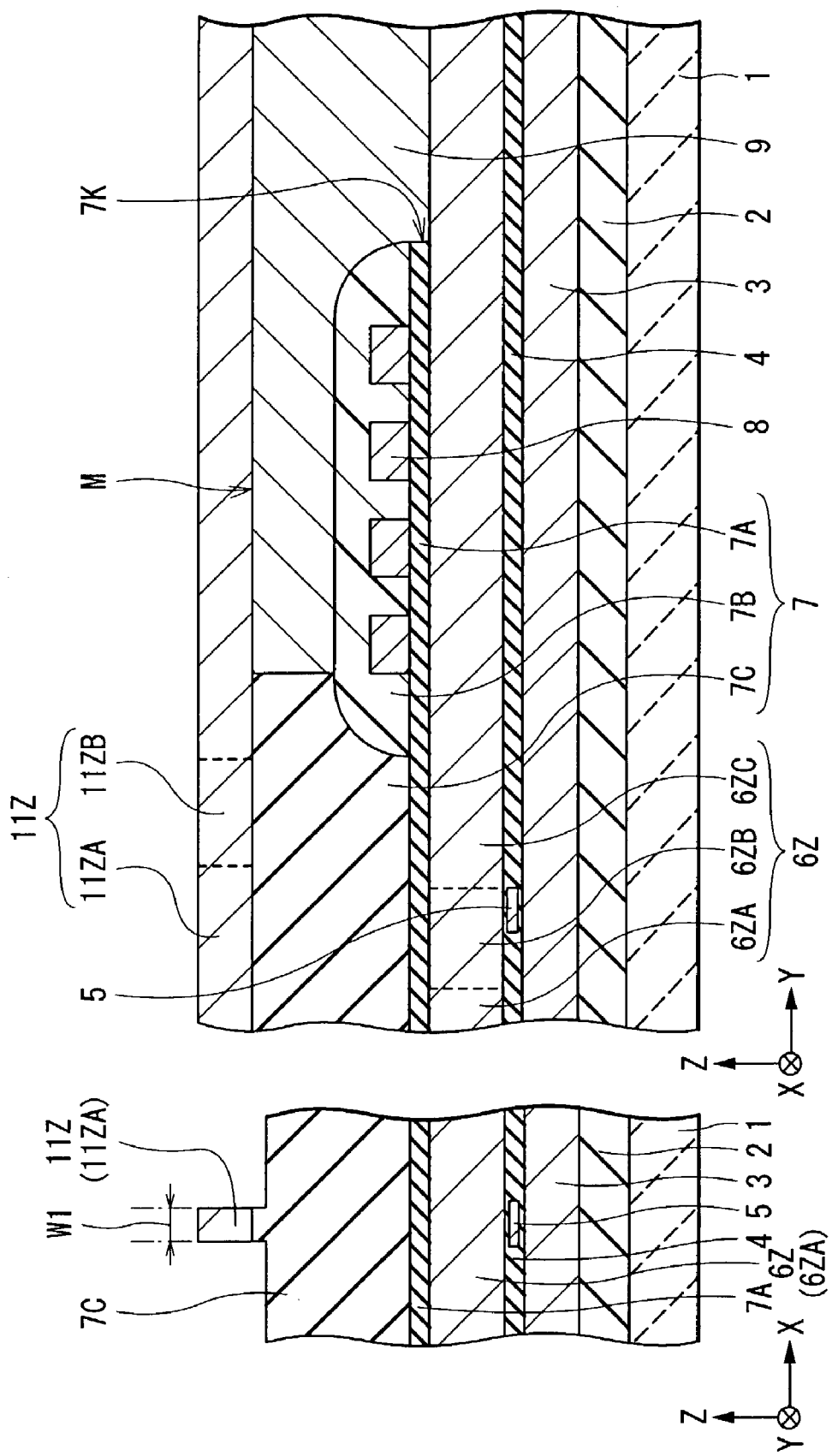
FIGS. 11A and 11B are sectional views for describing a step following the step of FIGS. 10A and 10B.

After the precursor return yoke layer 6Z is formed, as shown in FIGS. 11A and 11B, the gap layer 7 (gap layer portions 7A, 7B and 7C) having the aperture 7K is formed on the precursor return yoke layer 6Z so as to bury the thin film coil 8, and the yoke layer 9 is formed so as to be magnetically coupled to the precursor return yoke layer 6Z through the aperture 7K. At this time, if necessary, the gap layer portion 7C and the yoke layer 9 are polished so as to form the flat surface M.

Next, as shown in FIGS. 11A and 11B, the precursor pole layer 11Z is selectively formed on the flat surface M. For example, as shown in FIG. 15, the precursor pole layer 11Z is formed so as to include a front portion 11ZA with the uniform width W1 corresponding to the front end portion 11A of the pole layer 11 which is finally formed and a rear portion 11ZB with a wider width corresponding to the rear end portion 11B.

For example, steps of forming the precursor pole layer 11Z will be described below. After a magnetic layer (not shown) made of the material of the precursor pole layer 11Z is formed, a mask layer for patterning made of, for example, photoresist is formed on the magnetic layer. Then, the magnetic layer is patterned by using the mask layer through, for example, etching such as ion milling or the like so as to form the precursor pole layer 11Z in a pattern shape shown in FIG. 15. When the precursor pole layer 11Z is formed, for example, as shown in FIG. 11A, a region of the gap layer portion 7C on the periphery of the front portion 11ZA is selectively dug down.

Figures 12A, 12B:
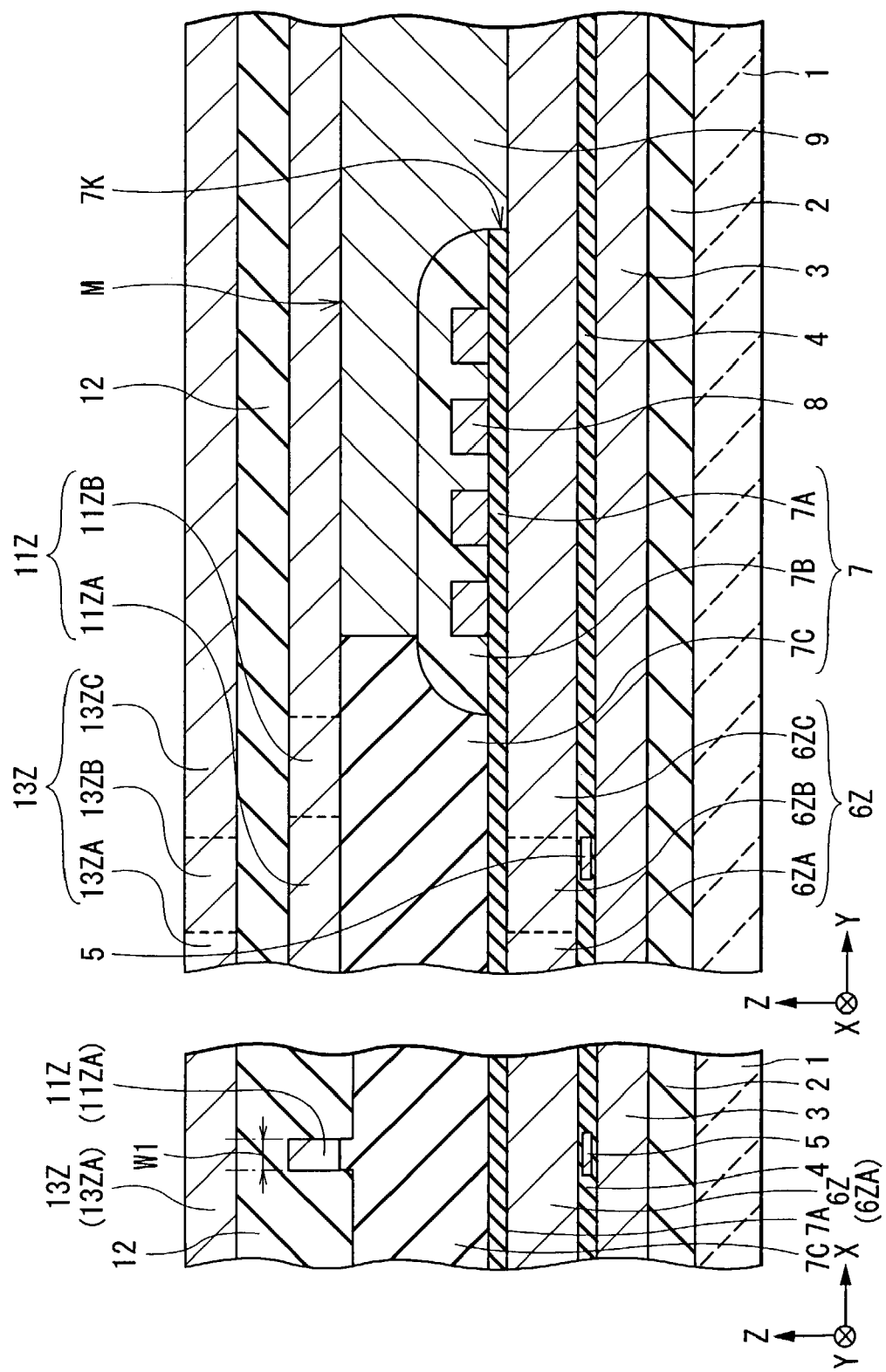
FIGS. 12A and 12B are sectional views for describing a step following the step of FIGS. 11A and 11B.

Next, as shown in FIGS. 12A and 12B, after the insulating layer 12 is formed so that the precursor pole layer 11Z and its surrounding is coated with the insulating layer 12, a precursor write shield layer 13Z is selectively formed on the insulating layer 12 through, for example, frame plating. For example, as shown in FIG. 16, the precursor write shield layer 13Z is formed so as to include a rear portion 13ZC with the uniform width W2, a front portion 13ZA with a smaller uniform width than that of the rear portion 13ZC, and a middle portion 13ZB being disposed between the front portion 13ZA and the rear portion 13ZC and having two taper surfaces 13TR and 13TL to continuously narrow the width of the middle portion 13ZB toward the front. At this time, the taper angle $\theta2$ between each of the taper surfaces 13TR and 13TL of the middle portion 13ZB and the air bearing surface 20 (refer to FIG. 3) which will be formed in a later step is preferably within a range approximately from 5° to 40°, more preferably within a range approximately from 10° to 30°.

Figures 13A, 13B:
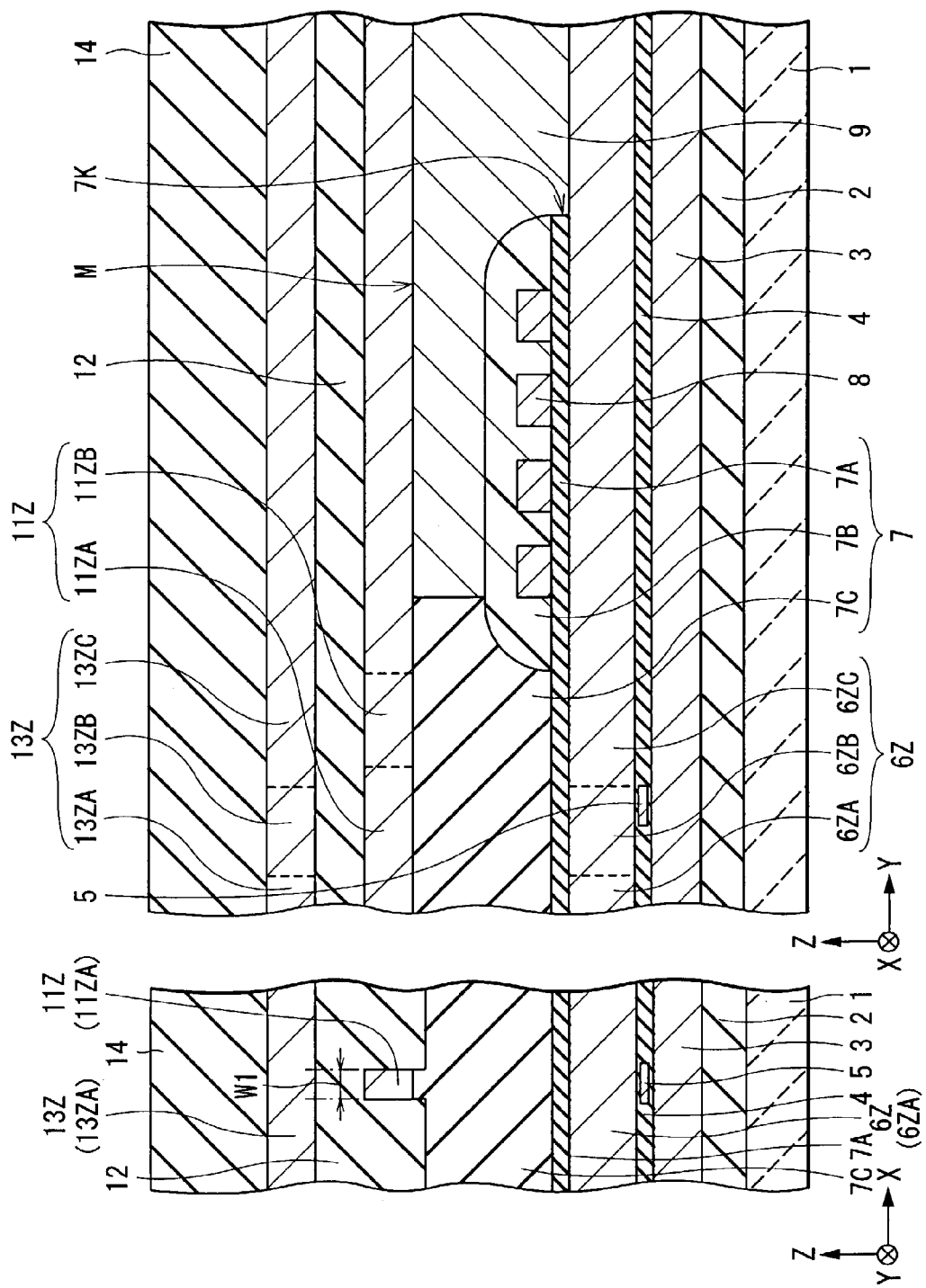
FIGS. 13A and 13B are sectional views for describing a step following the step of FIGS. 12A and 12B.

Next, as shown in FIGS. 13A and 13B, the overcoat layer 14 is formed so that the precursor write shield layer 13Z and its surroundings are coated with the overcoat layer 14.

Finally, the whole formation including the precursor return yoke layer 6Z, the precursor pole layer 11Z and the precursor write shield layer 13Z is polished from the front through machining or polishing so that a polished surface becomes flat, thereby as shown in FIGS. 1A through 3, the air bearing surface 20 is formed. When the air bearing surface 20 is formed, the middle portion 6ZB of the precursor return yoke layer 6Z, the front portion 11ZA of the precursor pole layer 11Z and the middle portion 13ZB of the precursor write shield layer 13Z are polished until reaching a halfway point thereof. As a result of polishing, a region from the front portion 6ZA to the middle portion 6ZB in the precursor return yoke layer 6Z is selectively removed so as to form the return yoke layer 6 including the front portion 6A which has two taper surfaces 6TR and 6TL on the both sides to continuously narrow the width of the front portion 6A toward the front and the rear portion 6B magnetically coupled to the front portion 6A. Further, a region from the front portion 13ZA to the middle portion 13ZB in the precursor write shield layer 13Z is selectively removed so as to form the write shield layer 13 including the front portion 13A which has two taper surfaces 13TR and 13TL on the both sides to continuously narrow the width of the front portion 13A toward the front and the rear portion 6B magnetically coupled to the front portion 13A. Moreover, a part of the front portion 11ZA of the precursor pole layer 11Z is selectively removed so as to form the pole layer 11 including the front end portion 11A with the uniform width W1 determining the recording track width and the rear end portion 11B magnetically coupled to the front end portion 11A. Thereby, the thin film magnetic head comprising the reproducing head portion 100A and the recording head portion 100B is completed.

In the method of manufacturing the thin film magnetic head according to the embodiment, after the precursor return yoke layer 6Z including the middle portion 6ZB which has two taper surfaces 6TR and 6TL to continuously narrow the width of the middle portion 6ZB toward the front is formed, the precursor return yoke layer 6Z is polished until reaching a halfway point of the middle portion 6ZB, so the return yoke layer 6 having two taper surfaces 6TR and 6TL is formed. Therefore, the return yoke layer 6 can be formed with high accuracy, because of the following reason.

As described above as the specific example of dimensions, the dimensions of two taper surfaces 6TR and 6TL are extremely minute relative to the whole dimensions of the return yoke layer 6. Therefore, when the return yoke layer 6 is formed only in one step using, for example, a pattern forming technique such as frame plating, it is difficult to form the minute taper surfaces 6TR and 6TL with high accuracy.

On the other hand, in the embodiment, the precursor return yoke layer 6Z is formed so that the middle portion 6ZB includes large taper surfaces 6TR and 6TL in advance, and then the middle portion 6ZB of the precursor return yoke layer 6Z is polished, so when the precursor return yoke layer 6Z is polished, the width L1 or the length L2 of the taper surfaces 6TR and 6TL can be freely controlled by adjusting an amount of polishing of the middle portion 6ZB. Therefore, in the embodiment, compared to the return yoke layer 6 formed only in one step using the pattern forming technique, the forming accuracy of the minute taper surfaces 6TR and 6TL finally disposed on the return yoke layer 6 can be secured, so the return yoke layer 6 can be formed with high accuracy.

Moreover, in the embodiment, the precursor return yoke layer 6Z is polished by use of polishing for forming the air bearing surface 20, so another polishing is not required to polish the precursor return yoke layer 6Z. Therefore, in the embodiment, the precursor return yoke layer 6Z is polished without increasing the number of manufacturing steps, thereby, the return yoke layer 6 having two taper surfaces 6TR and 6TL can be formed. Therefore, the return yoke layer 6 can be formed more easily for a shorter time.

Moreover, in the embodiment, after the precursor write shield layer 13Z is formed so as to include the middle portion 13ZB having two taper surfaces 13TR and 13TL to continuously narrow the width of the middle portion 13ZB toward the front, the precursor write shield layer 13Z is polished until reaching a halfway point of the middle portion 13ZB so as to form the write shield layer 13 having two taper surfaces 13TR and 13TL. Therefore, by the same effect as in the case where the return yoke layer 6 is formed, the forming accuracy of the minute taper surfaces 13TR and 13TL can be secured, and the step of polishing to form the air bearing surface 20 can be also used to form the write shield layer 13, so the write shield layer 13 can be formed more easily with higher accuracy.

In the embodiment, the patterning technique using etching is used to form the precursor pole layer 11Z, but it is not necessarily limited to this. For example, frame plating may be used. However, in this case, it is difficult to form the uniform width W1 of the front portion 11ZA with high accuracy, so, for example, the combined use of frame plating and etching is preferable. More specifically, after the precursor pole layer 11Z is formed so that the front portion 11ZA has a larger width than the uniform width W1, the precursor pole layer 11Z is etched so as to form the uniform width W1 by narrowing the width of the front portion 11ZA. Thereby, the precursor pole layer 11Z can be formed with higher accuracy.

The present invention is described referring to the embodiments, but the invention is not limited to the embodiments, and can be variously modified. For example, in the embodiment, the case where the invention is applied to "a single-pole type head" is described, but it is not limited to this. For example, the invention may be applied to "a ring-type head".

Further, in the embodiments, the case where the invention is applied to a composite thin film magnetic head is described, but it is not limited to this. The invention is applicable to, for example, a thin film magnetic head for recording only comprising an inductive magnetic transducer for writing or a thin film magnetic head having an inductive magnetic transducer for recording/reproducing. In addition, the invention is applicable to a thin film magnetic head with a structure in which a device for writing and a device for reproducing are inversely laminated. Further, the invention is applicable to not only the perpendicular recording system thin film magnetic head but also a longitudinal recording system (in-plane recording system) thin film magnetic head.

As described above, in the thin film magnetic head according to the invention, the return magnetic layer is formed so as to include the width change portion with a width continuously narrowed toward an end surface exposed to the recording-medium-facing surface, so the return magnetic layer has no sharp corner portion which can induce local concentration of the returned magnetic flux in proximity to the recording-medium-facing surface. Therefore, the local concentration of the returned magnetic flux resulting from the existence of the corner portion can be prevented, thereby the probability of the occurrence of unnecessary recording decreases, so the occurrence of track erasing can be inhibited, and the reliability of magnetic recording can be improved.

In the method of manufacturing the thin film magnetic head according to the invention, the precursor return magnetic layer including the precursor width change portion with a continuously narrowed width is formed, and then a laminate including the precursor return magnetic layer is polished until reaching a halfway point of the precursor width change portion so as to form the recording-medium-facing surface, thereby forming the return magnetic layer including the width change portion with a width continuously narrowed toward an end surface exposed to the recording-medium-facing surface. Therefore, compared to the case where the return magnetic layer is formed only in one step using the pattern formation technique, the return magnetic layer including the width change portion can be formed with higher accuracy for a shorter time.

Moreover, in thin film magnetic head according to the invention, an angle between each of the taper surfaces of the width change portion and the recording-medium-facing surface is within a range from 5° to 40°, so the local concentration of the returned magnetic flux in proximity to the recording-medium-facing surface can be effectively prevented.

Further, in the thin film magnetic head according to the invention, the first shield layer is formed so as to include a portion with a width continuously narrowed from a predetermined position on a side away from the recording-medium-facing surface toward the recording-medium-facing surface, so even if the magnetic flux is returned to the first shield layer during recording, the local concentration of the returned magnetic flux in the first shield layer can be prevented. Therefore, the occurrence of track erasing by the first shield layer can be inhibited.

In addition, in the thin film magnetic head according to the invention, the second shield layer is formed so as to include a portion with a width continuously narrowed from a predetermined position on a side away from the recording-medium-facing surface toward the recording-medium-facing surface, so the local concentration of the returned magnetic flux in the second shield layer can be prevented. Therefore, the occurrence of track erasing by the second shield layer can be inhibited.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head, comprising:
a thin film coil generating a magnetic flux;
a pole layer having a pole end surface exposed to a recording-medium-facing surface facing a recording medium, and emitting the magnetic flux generated by the thin film coil from the pole end surface toward the recording medium,
the pole layer emitting the flux for magnetizing the recording medium in a direction perpendicular to a surface of the recording medium; and
a return magnetic layer where the magnetic flux emitted from the pole layer to magnetize the recording medium is returned,
wherein the return magnetic layer includes an end surface exposed to the recording-medium-facing surface and a width change portion with a width continuously narrowed toward the end surface.

2. A thin film magnetic head according to claim 1, wherein the width of the width change portion is narrowed from both sides.

3. A thin film magnetic head according to claim 2, wherein the width change portion has taper surfaces on both sides, and
an angle between each of the taper surfaces and the recording-medium-facing surface is within a range from 5° to 40°.

4. A thin film magnetic head according to claim 1, further comprising:
a first shield layer magnetically shielding the pole layer from its surroundings,
wherein the first shield layer includes a portion with a width continuously narrowed from a predetermined position on a side away from the recording-medium-facing surface toward the recording-medium-facing surface.

5. A thin film magnetic head according to claim 1, further comprising:
a magnetoresistive device; and
a second shield layer magnetically shielding the magnetoresistive device from its surroundings,
wherein the second shield layer includes a portion with a width continuously narrowed from a predetermined position on a side away from the recording-medium-facing surface toward the recording-medium-facing surface.

6. A thin film magnetic head, comprising:
a thin film coil generating a magnetic flux;
a pole layer having a pole end surface exposed to a recording-medium-facing surface facing a recording medium, and emitting the magnetic flux generated by the thin film coil from the pole end surface toward the recording medium;
a return magnetic layer where the magnetic flux emitted from the pole layer to magnetize the recording medium is returned,
wherein the return magnetic layer includes an end surface exposed to the recording-medium-facing surface and a width change portion with a width continuously narrowed toward the end surface; and
a first shield layer magnetically shielding the pole layer from its surroundings,
wherein the first shield layer includes a portion with a width continuously narrowed from a predetermined position on a side away from the recording-medium-facing surface toward the recording-medium-facing surface.

* * * * *